United States Patent [19]

Hirsch

[11] Patent Number: 5,442,911
[45] Date of Patent: Aug. 22, 1995

[54] EXHAUST GAS AFTERTREATMENT EQUIPMENT FOR AN INTERNAL COMBUSTION ENGINE

[75] Inventor: Klaus Hirsch, Bad Friedrichshall, Germany

[73] Assignee: Audi AG, Ingolstadt, Germany

[21] Appl. No.: 193,704

[22] Filed: Feb. 9, 1994

[30] Foreign Application Priority Data

Feb. 11, 1993 [DE] Germany .................. 43 04 144.2

[51] Int. Cl.⁶ ............................................ F01N 3/20
[52] U.S. Cl. ............................ 60/277; 60/293; 60/305
[58] Field of Search ............... 60/274, 277, 285, 287, 60/293, 304, 305, 306, 307

[56] References Cited

U.S. PATENT DOCUMENTS

| | | | |
|---|---|---|---|
| 4,084,372 | 4/1978 | Kuroda | 60/305 |
| 4,085,586 | 4/1978 | Shibata | 60/277 |
| 4,172,362 | 10/1979 | Mizuno | 60/305 |
| 4,299,089 | 11/1981 | Takeda . | |
| 4,464,896 | 8/1984 | Kubota | 60/293 |
| 5,177,464 | 1/1993 | Hamburg | 60/277 |
| 5,233,829 | 8/1993 | Komatsu | 60/277 |
| 5,247,793 | 9/1993 | Yamada | 60/277 |

FOREIGN PATENT DOCUMENTS 2135206 2/1972 Germany .
2106608 4/1972 Germany .

*Primary Examiner*—Ira S. Lazarus
*Assistant Examiner*—Daniel J. O'Connor
*Attorney, Agent, or Firm*—Kane, Dalsimer, Sullivan, Kurucz, Levy, Eisele and Richard

[57] ABSTRACT

Exhaust-gas aftertreatment equipment for an internal combustion engine has a secondary air pump, the delivery pipeline of which discharges into the exhaust system of the internal combustion engine and in which a check valve is disposed. In order to avoid hot exhaust gases flowing back in the event of a defect in the check valve, a heat sensor, which switches the secondary air pump on when a particular temperature is exceeded, is disposed in the air-delivery pipeline. The air, so delivered, mixes with the hot exhaust gases and this mixture is introduced into the exhaust gas system during the negative pressure phases of the exhaust system.

4 Claims, 1 Drawing Sheet

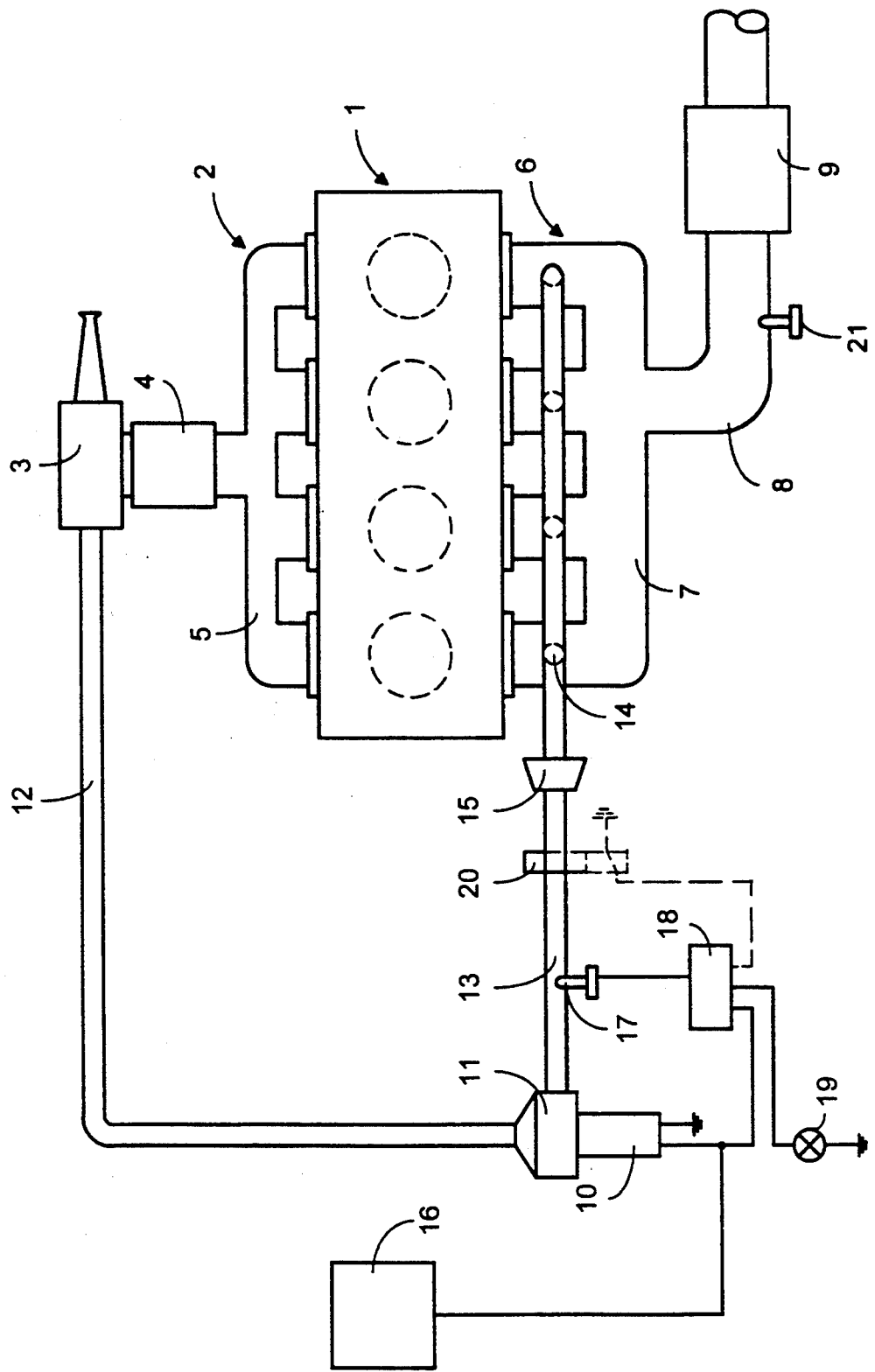

EXHAUST GAS AFTERTREATMENT EQUIPMENT FOR AN INTERNAL COMBUSTION ENGINE

BACKGROUND OF THE INVENTION

In exhaust gas aftertreatment for a vehicular internal combustion engine, the secondary air pump generally is switched on only briefly, particularly during the warming up phase of the internal combustion engine in order to burn the unburned fuel in the exhaust gas, which accumulated during cold starting. This means that the check valve in the air delivery pipeline is exposed more or less directly to the hot exhaust gases during the bulk of the operating time, so that the danger exists that it will leak or be destroyed in the course of time. Pressure fluctuations occurring in the exhaust system may also cause mechanical failures. In this case, hot exhaust gas can enter the air delivery pipelines and, under some circumstances reach the secondary air pump, thereby damaging it. Moreover, the air delivery-pipeline can burn through, as it consists, at least partly, of elastic material, since the secondary air pump is generally mounted on the car body and therefore has to be connected with the exhaust system by means of a flexible pipeline.

SUMMARY OF THE INVENTION

It is a principal object of the present invention to increase the reliability of vehicular exhaust gas aftertreatment equipment.

In order to accomplish this objective, the present invention proposes to place a heat sensor in the air delivery pipeline upstream from the check valve. When a certain temperature is exceeded, this heat sensor switches the secondary air pump on or activates an additional stop valve in the air delivery pipeline.

As mentioned, a leaking or defective check valve results in the flow of hot exhaust gases into the air-delivery pipeline. Therefore, such flow is detected immediately by the heat sensor. By switching on the secondary air pump, exhaust gas, which has penetrated into the air-delivery pipeline, is mixed with air and this mixture is returned to the exhaust system during each negative pressure phase. If an additional stop valve is provided in the air-delivery pipeline, further penetration of hot exhaust gases is prevented by its activation. Damage to this stop valve by hot exhaust gases need not be feared since, in the case of a defective check valve only a relatively small amount can pass through this check valve and the stop valve is positively controlled and thus cannot stick, as can an automatic check valve.

Alternatively, or in addition to switching on the secondary air pump or activating the additional stop valve, the heat sensor can emit a warning signal, which indicates the defect to the user and, hopefully, will induce him to visit a repair shop as soon as possible.

Other objects and advantages will become apparent from the following description which is to be taken in conjunction with the accompanying drawing.

BRIEF DESCRIPTION OF THE DRAWING

An embodiment of the invention is described in the following with reference to the drawing, in which exhaust gas aftertreatment equipment of a vehicular internal combustion engine is shown diagrammatically.

DETAILED DESCRIPTION

The internal combustion engine 1 has an exhaust system 2 with an air filter 3, a carburetor or fuel injection system 4 and an intake manifold 5 as well as an exhaust system 6 with an exhaust manifold 7, to which an exhaust pipe 8 is connected, a catalyst 9 and a muffler, which is not shown. A secondary air pump 11, driven by an electric motor 10, is connected by means of its intake line 12 with the air filter 3. Its delivery pipeline 13 extends as far as the exhaust system 6 and is connected with the individual exhaust pipes through branch pipelines 14. In the air-delivery pipeline 13, a check valve 15 is disposed, which prevents exhaust gases flowing during positive pressure phases from the exhaust system 6 back into the delivery pipeline 13. The secondary air pump 11 or its driving motor 10 is controlled by means of control equipment 16, which switches on the secondary air pump 11 particularly in the warming-up phase of the internal combustion engine 1.

If the check valve 15 leaks or is defective and the secondary air pump 11 is not switched on, which is the case during the bulk of the operating time, hot exhaust gas can penetrate into the air-delivery pipeline 13 and possibly as far as the secondary air pump 11 and cause damage to these components. In addition, damage or local destruction of the air-delivery pipeline 13 can occur, since this pipeline 13, because of the fact that the secondary air pump 11 is mounted on the car body, must be flexible at least in sections and therefore normally is formed of an elastomer. If the air-delivery pipeline were to burn through, this could lead to the escape of exhaust gases, and, under certain circumstances, to a fire in the engine space of the vehicle.

In order to avoid any of the foregoing undesirable situations, a heat sensor 17, which switches on the motor 18 of the secondary air pump 11 by means of control equipment 18 when the temperature in the air-delivery pipeline 13 exceeds a particular value, is disposed in the air-delivery pipeline 13 upstream from the check valve 15. The air, then delivered by the secondary air pump 11, mixes with the exhaust gas that has penetrated into the air-delivery pipeline 13 due to the defective or leaking check valve 15. During negative pressure phases in the exhaust system, this mixture is introduced into the system. This additional air is recognized by the Lambda probe 21, which can then intervene appropriately in the motor management, in order to avoid endangering the catalyst 9. Simultaneously or alternatively, the heat sensor 17 can activate a warning lamp 19, in order to draw the attention of the driver to the defect and alert him that it would be prudent to visit a repair shop.

As an alternative to switching the secondary air pump 11, an additional stop valve 20, preferably electrical, in the air delivery pipeline 13 upstream from the check valve 15 can be activated by the heat sensor 17 when a particular temperature is exceeded. This additional stop valve 20 reliably prevents penetration of hot exhaust gases into the air-delivery pipeline 13.

Thus, the several aforenoted objects and advantages are most effectively attained. Although several somewhat preferred embodiments have been disclosed and described in detail herein, it should be understood that this invention is in no sense limited hereby and its scope is to be determined by that of the appended claims.

What is claimed is:

1. Exhaust-gas aftertreatment equipment for an internal combustion engine, having a secondary air pump (11), which normally is driven for only a short time and has a delivery pipeline (13) which discharges into an exhaust system (6) of the internal combustion engine and in which a check valve (15) is disposed which permits flow from the secondary air pump (11) to the exhaust system (6), a heat sensor (17) disposed in the air-delivery pipeline (13) upstream from the check valve (15) which operates to switch the secondary air pump (11) on if the temperature in the air-delivery pipeline exceeds a certain value.

2. The exhaust-gas aftertreatment equipment of claim 1, characterized in that the heat sensor (17) alternatively turns on a warning signal means (19).

3. Exhaust-gas aftertreatment equipment for an internal combustion engine, having a secondary air pump (11), which normally is driven for only a short time and has a delivery pipeline (13) which discharges into an exhaust system (6) of the internal combustion engine and in which a check valve (15) is disposed which permits flow from the secondary air pump (11) to the exhaust system (6), an additional stop valve (20) and a heat sensor (17) disposed in the air-delivery pipeline (13) upstream from the check valve (15) to activate the additional stop valve (20) in the air-delivery pipeline if the temperature in the air-delivery pipeline exceeds a certain value.

4. The exhaust-gas aftertreatment equipment of claim 3, characterized in that the heat sensor (17) additionally turns on a warning signal means (19).

* * * * *